United States Patent
Chapman et al.

(10) Patent No.: US 6,936,362 B2
(45) Date of Patent: Aug. 30, 2005

(54) VARIABLE PRESSURE DROP STACK

(75) Inventors: Daryl Chapman, Victor, NY (US); Jeff A. Rock, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 196 days.

(21) Appl. No.: 10/413,032

(22) Filed: Apr. 14, 2003

(65) Prior Publication Data

US 2004/0202917 A1 Oct. 14, 2004

(51) Int. Cl.[7] .............................. H01M 8/04; H01M 4/94
(52) U.S. Cl. .............................. 429/13; 429/22; 429/23; 429/25; 429/38; 429/44
(58) Field of Search ........................ 429/13, 22, 23, 429/24, 25, 30, 32, 37, 38, 39, 44

(56) References Cited

U.S. PATENT DOCUMENTS

| | | | | |
|---|---|---|---|---|
| 4,973,531 A | * | 11/1990 | Zaima et al. ................. | 429/37 |
| 5,185,220 A | * | 2/1993 | Schora ...................... | 429/37 X |
| 5,419,980 A | * | 5/1995 | Okamoto et al. ............. | 429/32 |
| 5,484,666 A | | 1/1996 | Gibb et al. .................. | 429/34 |
| 5,547,777 A | | 8/1996 | Richards .................... | 429/32 |
| 5,707,755 A | | 1/1998 | Grot ........................... | 429/40 |
| 5,789,091 A | | 8/1998 | Wozniczka et al. .......... | 429/12 |
| 6,007,933 A | * | 12/1999 | Jones ......................... | 429/32 X |
| 6,040,072 A | | 3/2000 | Murphy et al. .............. | 429/12 |
| 6,428,921 B1 | * | 8/2002 | Grot ........................... | 429/37 |
| 6,663,996 B2 | * | 12/2003 | Gibb et al. .................. | 429/37 |
| 2004/0058223 A1 | * | 3/2004 | Shibata et al. .............. | 429/38 |

FOREIGN PATENT DOCUMENTS

| | | | |
|---|---|---|---|
| EP | 0 444 383 A1 | 9/1991 | ............ H01M/8/24 |
| EP | 0 981 174 A2 | 2/2000 | ............ H01M/8/24 |
| EP | 0 981 175 A2 | 2/2000 | ............ H01M/8/24 |
| JP | 61-225779 | 10/1986 | ............ H01M/8/24 |
| JP | 8-88018 | 4/1996 | ............ H01M/8/24 |
| JP | 11-97054 | 4/1999 | ............ H01M/8/24 |

* cited by examiner

*Primary Examiner*—Stephen J. Kalafut
(74) *Attorney, Agent, or Firm*—Harness, Dickey & Pierce, P.L.C.

(57) ABSTRACT

A fuel cell stack having a plurality of fuel cells arranged adjacent one another and compressed together. At least one of the fuel cells has an electrode plate with a flow field formed therein, a proton exchange membrane and a compressible fluid-permeable diffusion media that is disposed adjacent the electrode plate. A compressing member is operable to vary a compression of the fuel cells during operation which varies an intrusion of the compressible diffusion media into the flow field in the adjacent electrode plate. The variation of the intrusion of the diffusion media into the flow fields allows the control of the pressure drop across the fuel cell stack and enables the fuel cell stack to be dynamically controlled so that a desired operational state is achieved.

21 Claims, 3 Drawing Sheets

VARIABLE PRESSURE DROP STACK

FIELD OF THE INVENTION

The present invention relates to fuel cells and more particularly to fuel cells that are compressed varying amounts during operation so that a desired operation of the fuel cell is attained.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster.

In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. As such these MEAs are relatively expensive to manufacture and require certain conditions, including proper water management and humidification and control of catalyst fouling constituents such as carbon monoxide (CO), for effective operation.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

Interposed between the reactant flow fields and the MEA is a diffusion media serving several functions. One of these functions is the diffusion of reactant gases therethrough for reacting with the respective catalyst layer. Another is to diffuse reaction products, such as water, across the fuel cell. In order to properly perform these functions, the diffusion media must be sufficiently porous while maintaining sufficient strength. The strength is required to prevent the diffusion media from tearing when assembled within the fuel cell stack.

The flow fields are carefully sized so that at a certain flow rate of a reactant, a specified pressure drop between the flow field inlet and the flow field outlet is obtained. At higher flow rates, a higher pressure drop is obtained while at lower flow rates, a lower pressure drop is obtained. However, the pressure drop experienced between the flow field inlet and the flow field outlet may vary from the designed pressure drop. Such variations can be caused by variations in the manufacturing of the fuel cells and stack and/or in the tolerances of the components used in the fuel cells and stacks. Such variations from the designed pressure drop can be detrimental to the operation and/or performance of the fuel cells and stack.

Additionally, fuel cells and stacks can become unstable during low power draws. That is, during a low power requirement of the fuel cells and stack, the flow of reactants through the fuel cells and stack is reduced and the velocity of the reactants through the flow fields decreases which can cause the fuel cell stack to become unstable. One cause of instability is the reduced velocity of the reactant not providing enough shear force or dynamic pressure to transport reaction products ($H_2O$) out of the fuel cells. The inadequate shear force or dynamic pressure may not allow the gaseous reactants clear access to the reacting surfaces (catalyst layers) and may allow water and/or other reactants from the flow fields to build up within the flow channels. One method of improving the low power operation of a fuel cell stack is to design the flow channels to have a higher pressure drop so that during the low power draws a higher flow velocity results. However, this is impractical to do because the pressure drop generally increases linearly with flow rate. Thus, if the pressure drop is increased 10% at a low power point then the pressure drop is also increased 10% at a higher power point. Since pressure drop represents wasted energy, it is not desirable to increase the pressure drop at the higher power outputs of the fuel cell stack. Therefore, what is needed is an improved fuel cell and/or fuel cell stack having an improved flow field design.

SUMMARY OF THE INVENTION

The present invention provides a fuel cell and/or fuel cell stack that can be dynamically controlled so that different pressure drops occur in reactant flows through the fuel cell stack. The dynamic control allows for operation of the fuel cell and/or stack to be customized to a desired operational state.

A fuel cell stack according to the present invention has a plurality of fuel cells arranged adjacent one another. At least one fuel cell of the plurality of fuel cells has an electrode plate with a flow field formed therein, a proton exchange membrane and a compressible fluid-permeable diffusion media which is disposed adjacent the electrode plate. A compressing member is operable to variably compress the plurality of fuel cells together. The fuel cells are compressed together by the compressing member so that a portion of the diffusion media in the at least one fuel cell intrudes into the flow field in the adjacent electrode plate.

The present invention also provides a method of operating a fuel cell stack having a plurality of fuel cells with at least one fuel cell of the plurality of fuel cells having an electrode plate with a flow field formed therein, a proton exchange membrane and a compressible fluid-permeable diffusion media disposed adjacent the electrode plate which is compressible into the flow field. The method includes the steps of: (a) supplying reactant feed streams to a fuel cell stack; and (b) adjusting a compression of the fuel cell stack in response to an operating condition of the fuel cell stack such that the diffusion media moves relative to the flow field to change the effective flow area thereof.

As can be seen, the present invention provides a fuel cell and stack that has an adjustable pressure drop that can be changed while the fuel cell and stack are operating so that the pressure drop can be altered and a desired operational state of the fuel cell and stack achieved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
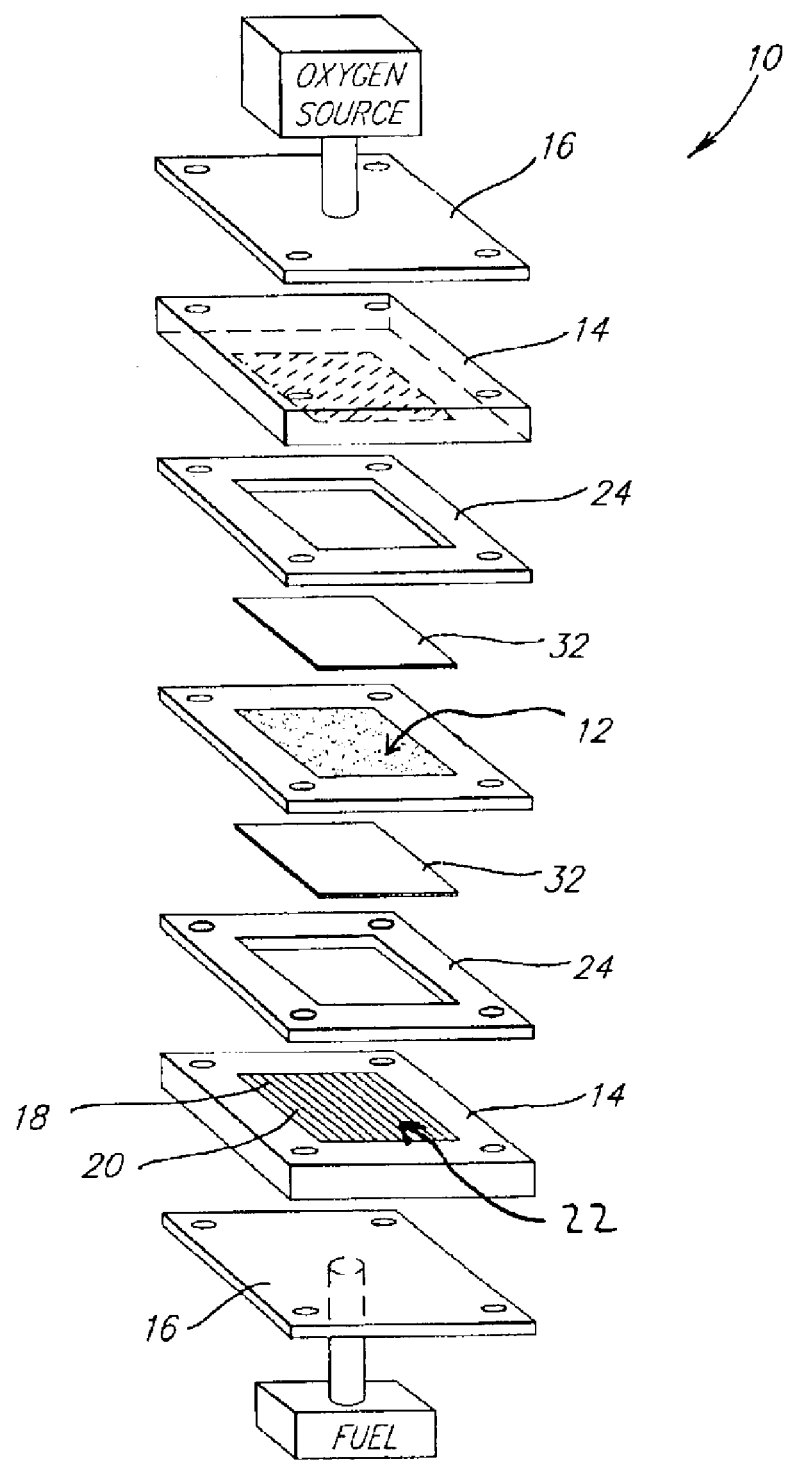
FIG. 1 is an exploded perspective view of a monocell fuel cell according to the principles of the present invention.
Figure 4A:
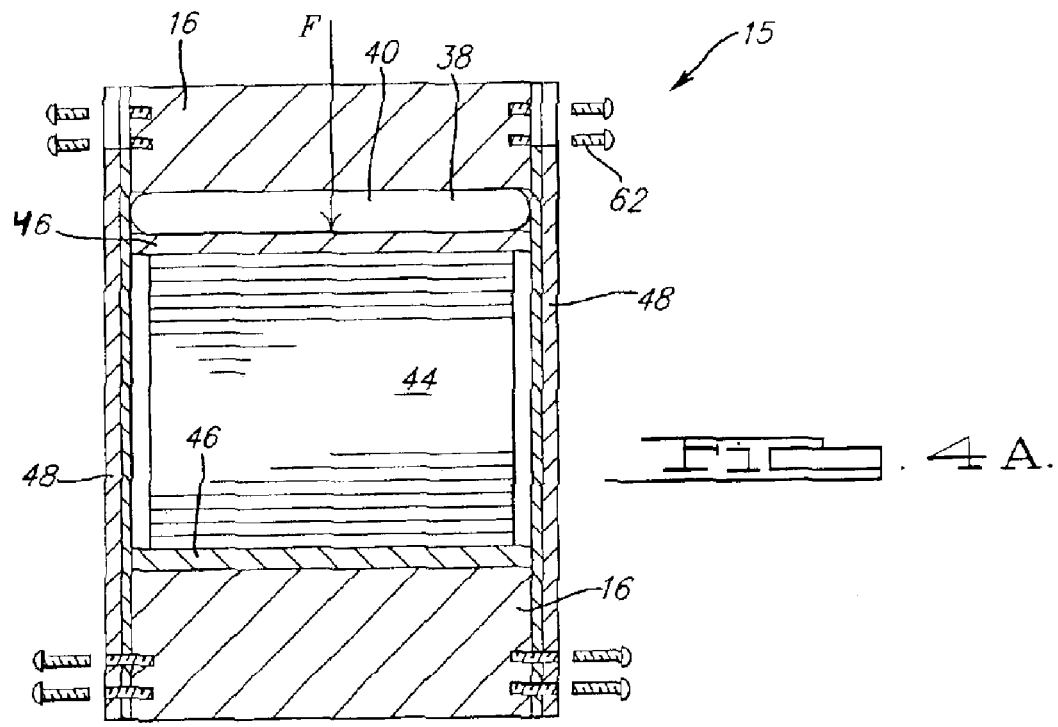
FIGS. 4A and 4B are simplified cross-sectional views of a fuel cell stack being compressed with an adjustable compressing member such as a fluid bladder and a ram, respectively, according to the principles of the present invention.
Figure 4B:
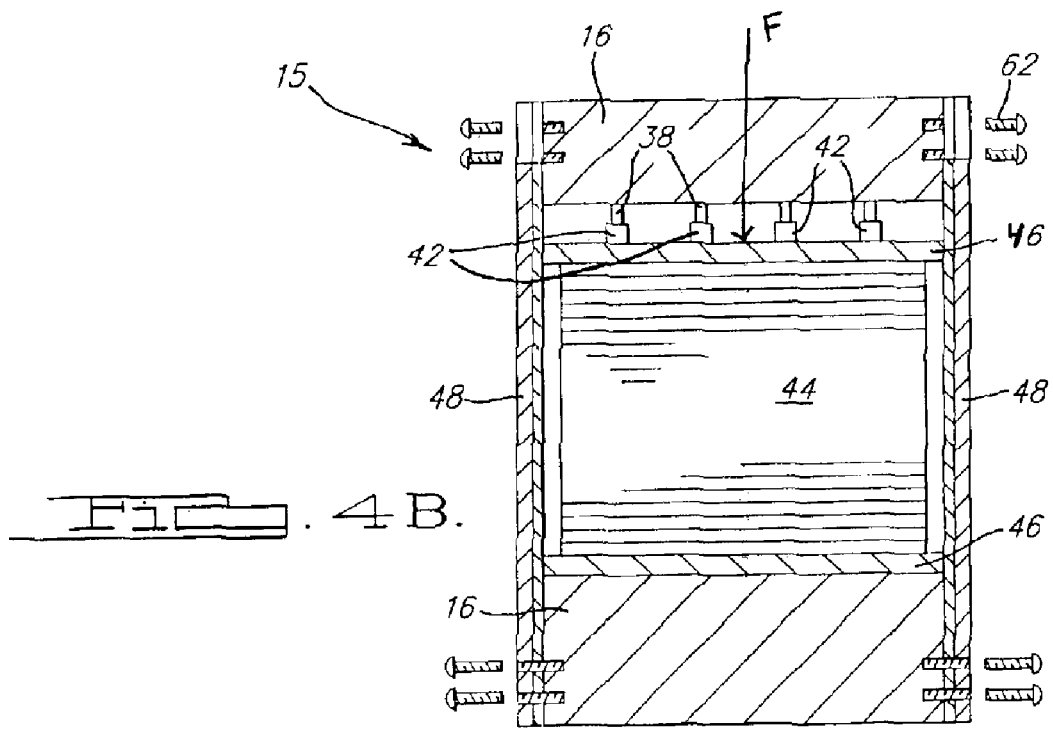

With reference to FIG. 1, a monocell fuel cell 10 is shown having an MEA 12 and a pair of diffusion media 32 sandwiched between a pair of electrically conductive electrode plates 14. It will be appreciated, however, that the present invention, as described hereinbelow, is equally applicable to fuel cell stacks 15 that comprise a plurality of single cells arranged in series and separated from one another by bipolar electrode plates commonly known in the art. Such fuel cell stacks 15 are shown in FIGS. 4A and 4B. For brevity, further reference may be made to either the fuel cell stack 15 or to an individual fuel cell 10, however, it should be understood that the discussions and descriptions associated with fuel cell stack 15 are also applicable to individual fuel cells 10 and vice versa and are within the scope of the present invention.

The plates 14 may be formed of carbon, graphite, coated plates or corrosion resistant metals. The MEA 12 and electrode plates 14 are clamped together between end plates 16. The electrode plates 14 each contain a plurality of lands 18 defining a plurality of flow channels 20 that form a flow field 22 for distributing reactant gases (i.e. $H_2$ and $O_2$) to opposing faces of the MEA 12. In the case of a multi-cell fuel cell stack 15, a flow field is formed on either side of the bipolar plate, one for $H_2$ and one for $O_2$. Nonconductive gaskets 24 provide seals and electrical insulation between the several components of the fuel cell 10.

Figure 2:
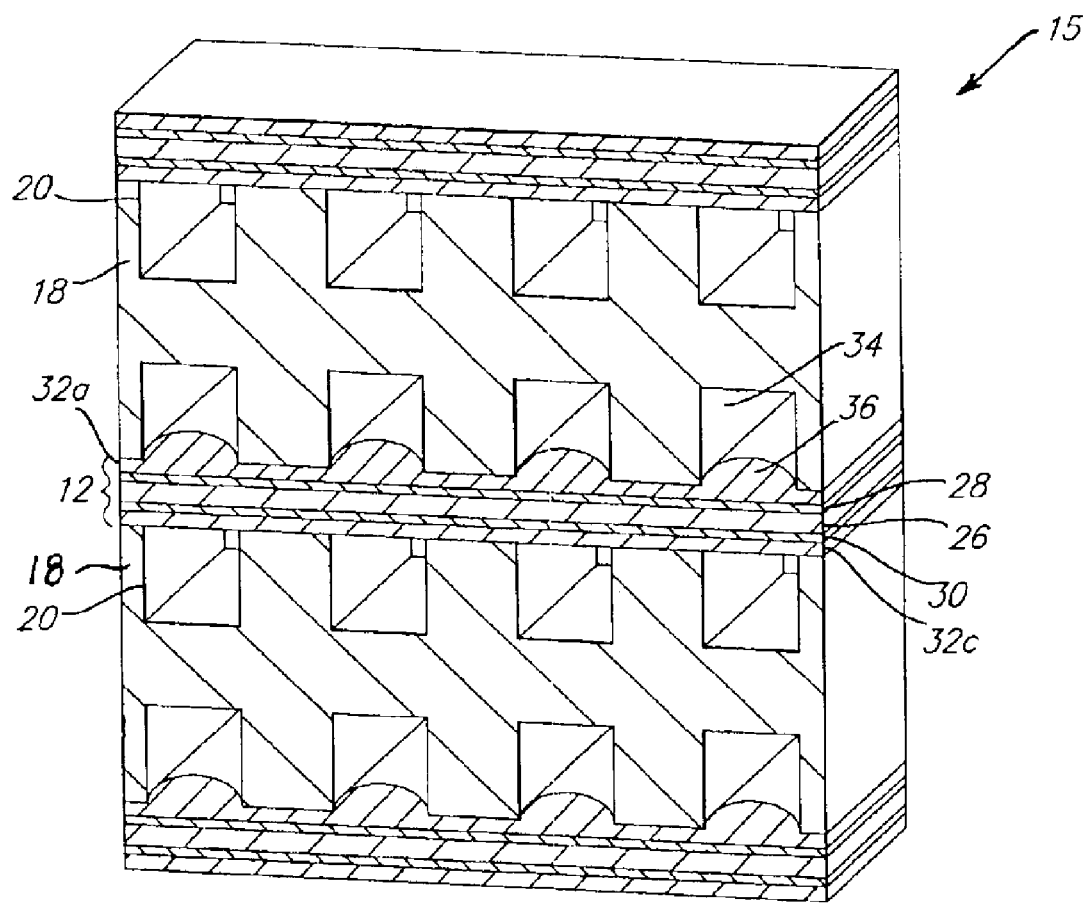
FIG. 2 is a partial perspective cross-sectional view of a portion of a PEM fuel cell stack containing a plurality of the fuel cells of FIG. 1 showing layering including diffusion media.
Figure 3:
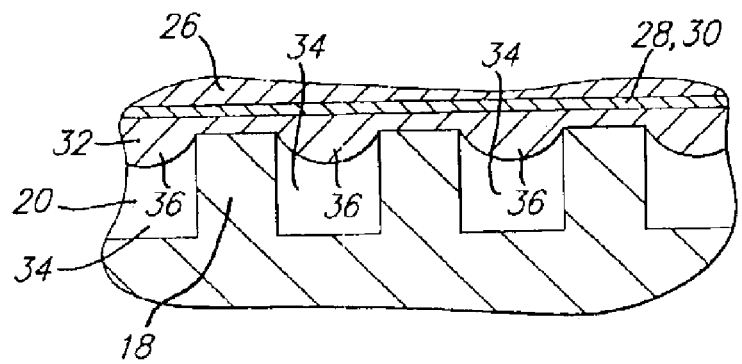
FIG. 3 is a detailed view of the portion illustrated in FIG. 2.

With particular reference to FIGS. 2 and 3, the MEA 12 includes a membrane 26 sandwiched between an anode catalyst layer 28 and a cathode catalyst layer 30. An anode diffusion media 32a and a cathode diffusion media 32c are interposed between the MEA 12 and the plate 14. As shown, $H_2$ flow channels 20, forming the anode side $H_2$ flow field, lie immediately adjacent the anode diffusion media 32a and are in direct fluid communication therewith. Similarly, $O_2$ flow channels 20, forming the cathode side $O_2$ flow field, lie immediately adjacent the cathode diffusion media 32c and are in direct fluid communication therewith. The membrane 26 is preferably a proton exchange membrane (PEM) and the cell having the PEM is referred to as a PEM fuel cell.

In operation, the $H_2$-containing reformate stream or pure $H_2$ stream (fuel feed stream) flows into an inlet side of the anode side flow field and concurrently, the $O_2$-containing reformate stream (air) or pure $O_2$ stream (oxidant feed stream) flows into an inlet side of the cathode side flow field. $H_2$ flows through anode diffusion media 32a and the presence of the anode catalyst 28 causes the $H_2$ to break into hydrogen ions ($H^+$), with each giving up an electron. The electrons travel from the anode side to an electric circuit (not shown) for enabling work to be performed (i.e. rotation of an electric motor). The membrane layer 26 enables $H^+$-ions to flow through while preventing electron flow therethrough. Thus, the $H^+$-ions flow directly through the membrane to the cathode catalyst 28. On the cathode side, the $H^+$-ions combine with $O_2$ and the electrons returning from the electric circuit, thereby forming water.

Still referring to FIGS. 2 and 3, flow channels 20 and MEA 12 are shown. Flow channels 20 are sized to have a specific flow area 34 through which the feed streams flow. The flow area 34 is sized so that at a certain flow rate of the feed streams through the flow channels 20, a specific pressure drop occurs across the flow field 22. That is, at a certain flow rate the gaseous reactants flowing through the channels 20 will experience a pressure drop between an inlet and an outlet of the flow field 22. The flow rate of the feed streams through the flow field 22 may vary depending upon the operation of the fuel cell stack 15, such as when higher or lower power output is required. As was state above, it is desirable to be able to alter the specific pressure drop that occurs across flow field 22 to adjust and/or optimize operation of fuel cell stack 15.

To change the pressure drop that occurs across flow field 22 for a specific flow rate of a feed stream, diffusion media 32, as shown in FIGS. 2 and 3, is compressible and can be compressed into flow channels 20 of flow field 22. Specifically, MEA 12 is compressed between adjacent electrode plates 14 so that a portion 36 of compressible media 32 intrudes into flow channels 20. As shown in FIGS. 4A and 4B, fuel cell stack 15 is compressed by an adjustable compressing member 38 that applies a compressive force F which causes the plurality of fuel cells 10 to compress together and causes compressible diffusion media 32 to compress and intrude into flow channels 20 of flow field 22. Preferably, compressible media 32 elastically deforms between about 0–50%. More specifically, a cross-sectional area of compressible media 32 preferably elastically deforms between about 0–50%. The intrusion of portions 36 of diffusion media 32 into flow channels 20 reduces flow area 34. Reduction in flow area 34 restricts flow of a feed stream through flow channel 20 and flow field 22. The restriction causes an increased pressure drop to occur for a given flow rate of the feed stream. The amount of intrusion of media 32 into flow channels 20 is dependent upon a variety of factors, such as the specific characteristics of diffusion media 32, the geometry/dimensions (depth and width) of flow channels 20 and the amount of force F applied. The variable restriction of the flow channels 20 allows for control of a feed stream flowing through flow channel 20.

Diffusion media 32, as was stated above, is used as both an anode diffusion media 32a and a cathode diffusion media 32c. Diffusion media 32 can be compressible or non-compressible at the typical forces F that are applied to fuel stack 15. Typically, fuel cell stack 15 is compressed an amount that causes a pressure in a range between about 25–200 psi to be experienced across a total cross-sectional area of fuel cell stack 15. Because of gaps, voids and spaces in the various components that comprise the fuel cells 10 and the fuel cell stack 15, only about 50% of the total cross-sectional area is typically in contact with other components. Therefore, a typical fuel cell stack 15 is compressed an amount that causes a compressive force or pressure in a range between about 50–400 psi to be experienced by fuel cell stack 15. It should be understood, however, that other compressive forces can be applied and still be within the scope of the present invention. It should also be understood that the terms "compressible" and "non-compressible" as used herein are relative terms that are used to describe the ability of one diffusion media 32 to be compressed and intrude into flow channels 20 at the range of compressive forces expected to be encountered in a fuel cell stack 15, relative to another diffusion media 32 not intruding into flow channels 20 any significant amount at the same range of compressive forces expected to be encountered. A significant amount of intrusion into flow channel 20 is that which allows a flow in the flow channel to be adjusted and controlled as described herein. In other words, non-compressible indicates the media has essentially no discernable or functional effect on the flow through the channel.

Referring to FIGS. 4A and 4B, an adjustable compressing member 38 applies compressive force F to fuel cell stack 15. The magnitude of the compressive force F applied by compressing member 38 can be adjusted during both operation (static or dynamic) and non-operation of fuel cell stack 15. Compressing member 38 is sized to be capable of applying a compressive force F of a magnitude that enables a fuel cell stack 15 to be operated at a desired operational state. A variety of different compressing members 38 can be utilized to apply compressive force F. For example, as shown in FIG. 4A, compressing member 38 can be a fluid bladder 40. Bladder 40 has an interior that can be filled with varying amounts of a fluid (e.g., air, water) at a given pressure. Bladder 40 expands and contracts in response to the quantity and/or pressure of the fluid in the bladder 40. As fluid is added, bladder 40 expands and fluid pressure builds causing compressive force F to increase which results in an increase in the compression of fuel cell stack 15. Conversely, as fluid is removed, bladder 40 contracts and fluid pressure decreases causing compressive force F to decrease which results in a decrease in the compression of fuel cell stack 15.

Another example of a compressing member 38 that can be used is a ram 42, as shown in FIG. 4B. Ram 42 has a length that is adjustable and can be fluid controlled or mechanically controlled. A fluid controlled ram 42 has a piston that moves in response to a fluid (e.g., hydraulic, pneumatic). As the fluid is supplied to and removed from ram 42, the length increases and decreases and causes the compressive force F to increase and decrease, respectively, which results in increased and decreased compression of fuel cell stack 15. A mechanically controlled ram 42 can have an actuator in the form of a rotational collar and a jack screw that moves in response to rotation of the collar. Alternatively, a cam or gear driven rod can be utilized as the actuator. As the actuator moves the magnitude of compressive force F changes which results in a change to the compression of fuel cell stack 15.

Compressing member 38 is shown and described as being a bladder 38 or a ram 42 for exemplary purposes. It should be understood that other devices and/or arrangements can be utilized for compressing member 38, that allow variation in the compression of fuel cell stack 15 in response to a control signal during operation, and still be within the scope of the present invention.

As was stated above, diffusion media 32 can be provided in either a compressible form or a non-compressible form, depending upon the application and design specifications for the fuel cell 10. Preferably, only one of the diffusion media 32a or 32c is compressible while the other is non-compressible. By having only one type (anode or cathode) of diffusion media 32 compressible, one set of flow channels 20 can be sized for a specific pressure drop at a given flow rate while the other set of channels 20 have a flow area 34 that will vary with the compression of the fuel cells 10. This in turn allows for the operation of the fuel cell stack 15 to be adjusted to a desired operation, as will be discussed below. It should be appreciated, however, that both diffusion media 32a and 32c can be compressible and still be within the scope of the present invention. It should also be understood that not all of the fuel cells 10 that comprise fuel cell stack 15 need to have a compressible media 32 to be within the scope of the invention. That is, the number of fuel cells 10 that have a compressible media 32 that comprise fuel cell stack 15 can vary depending upon the design of the fuel cell stack 15. Therefore, fuel cell stack 15 can include some fuel cells 10 that do not have a compressible media 32 and still be within the scope of the present invention.

The choice of whether to have a compressible anode diffusion media 32a or a compressible cathode diffusion media 32c will depend upon a desired operation and control of fuel cell stack 15. For example, when the fuel supplied to the fuel cell 10 is an $H_2$-containing reformate stream from a reforming system, it is preferred to adjust flow area 34 in anode flow channels 20 by providing a compressible anode diffusion media 32a. The use of a compressible anode diffusion media 32a enables the amount of reformate fuel flowing through the anode flow channels 20 to be accurately controlled. This is preferred because reformate fuel is typically provided by an onboard reforming system that uses energy produced by the fuel cell system to generate the reformate fuel. Since energy is being expended to produce the reformate fuel, it is preferred to supply only the needed (required) amount of reformate fuel to minimize any waste. The reduction in the amount of reformate fuel in the anode exhaust (waste) allows for more efficient operation of the fuel cell system within which the fuel cells 10 operate. Therefore, when a reformate fuel is used, it is preferred that anode diffusion media 32a be compressible while cathode diffusion media 32c be non-compressible.

In contrast, when the fuel feed stream is $H_2$ from an onboard $H_2$ storage tank, it is preferred to adjust flow area 34 in cathode flow channels 20 by providing a compressible cathode diffusion media 32c. This is preferred because little or no energy is consumed by the fuel cell system to provide the $H_2$ fuel feed stream from the storage tank while energy from the fuel cell system is used to provide the oxidant feed stream in the form of compressor work. By controlling the pressure drop through the cathode flow channels 20 via compressible cathode diffusion media 32c, the use of the compressed oxidant feed stream can be minimized and/or optimized so that energy loss associated with excess compressor work is minimized. Additionally, by controlling the flow through the cathode flow channels 20, it is easier to keep fuel cell stack 15 humidified.

With respect to the performance requirements of diffusion media 32, along with being compressible or non-compressible, diffusion media 32 should be sufficiently electrically conductive, thermally conductive and fluid permeable. The fluid permeability of diffusion media 32 must be high for transporting reactant gas and/or $H_2O$ under lands 18 disposed between flow channels 20, the electrical conductivity must be high to transport electrons over flow channels 20 from lands 18 to MEA 12 and the thermal conductivity must be sufficient to transfer heat to the plate which is then dissipated through coolant in contact with the plate.

Diffusion media 32 enables the diffusion of the reactants (i.e., $H_2$ and $O_2$), as well as the reaction products (i.e., $H_2O$) therethrough. In this manner, the reactants are able to flow from flow channels 20, through diffusion media 32 and into contact with their respective catalysts for enabling the required reaction. As described previously, one product of the reaction is $H_2O$. The redistribution of $H_2O$ across fuel cell 10 is of significant importance to the performance of fuel cell 10. Diffusion media 32 enables the flow of $H_2O$ therethrough, from more hydrated areas to drier areas for homogeneously hydrating fuel cell 10. Further, the flow of electrons is also a significant factor in the performance of fuel cell 10. Inhibited electron flow results in poor performance and inefficiency.

Non-compressible diffusion media having the above stated characteristics, such as 060 TORAY® carbon paper, are known in the art and will not be described further. A compressible media 32 having these characteristics can be made from a variety of materials. For example, a woven carbon paper, such as V3 elat single side diffuser available from E-TEK division of De Nora N.A. of Sommerset, N.J., and CF cloth available from SGL Carbon AG of Wiesbaden, Germany, can be used as a compressible diffusion media. Furthermore, other materials having similar properties to the above mentioned materials can also be employed.

Compression of fuel cell stack 15 can be adjusted during operation to provide a specific pressure drop for a given operational state. Typical pressure drops are in the range of about 0.1–6 psi across the plate. However, other pressure drops can be employed without departing from the scope of the present invention. The specific pressure drop experienced by a feed stream will vary depending upon a flow rate of the feed steam and the size of flow area 34 through flow channels 20.

By adjusting the compression of fuel cell stack 15, the intrusion of portions 36 of compressible diffusion media 32 into flow channels 20 is controlled. Controlling the intrusion allows the pressure drop to be controlled. Controlling the pressure drop can ensure that a that a minimum velocity of a feed stream flowing through flow fields 22 is maintained or that a desired operational condition of fuel cell stack 15 is achieved. For example, at a low power level (reduced flow of feed stream) compression of fuel cell stack 15 can be increased, thereby increasing the intrusion of compressible media 32 into flow channels 20. The increased intrusion increases the pressure drop across the flow channels 20 and results an in increase in the velocity of the feed stream through the flow channels 20. As another example, during a high power level (increased flow of feed stream) compression of fuel cell stack 15 can be reduced, thereby decreasing the intrusion of compressible media 32 into flow channels 20. The decreased intrusion decreases the pressure drop across the flow channels 20 and results in a lower energy loss. The higher flow of the feed stream (due to the higher power level) does not require as large of a pressure drop as at lower power to maintain a minimum flow velocity. Maintaining a minimum velocity is desirable to ensure that an adequate shear force or dynamic pressure is generated by the feed stream to transport reaction products ($H_2O$) out of the fuel cells 10 to allow the gaseous reactants clear access to catalyst layers 28 and 30. Thus, operation of fuel cell stack 15 can be customized based upon its operating state.

Compressible diffusion media 32 can be compressed to varying degrees as dictated by the application within which the compressible diffusion media 32 is utilized. It is envisioned that the typical compression will be in the range of about 10 to 50%. However, it should be understood that other amounts of compression can be employed without departing from the scope of the present invention. The actual amount of compression will vary depending upon, among other things, the channel geometry (width and depth of the channels), the desired operation of fuel cell stack 15 (desired pressure drop and/or desired flow velocity), and the specific diffusion media used. Electrode plates 14 may employ an electrically conductive coating that requires compression to effectively conduct electricity. That is, the coatings on electrode plates 14 exhibit contact resistance and are not sufficiently conductive without being compressed. The envisioned 10% minimum compression accounts for variations in the manufacturing and tolerances of the components that comprise fuel cell stack 15 and ensures adequate compression and contact between compressible diffusion media 32 and adjacent electrode plates 14 so that the contact resistance of the electrode plates 14 is less than a nominal value. The compression requirements of such coatings can vary depending upon the exact nature of the coating and the design of the plates 14.

Referring now to FIGS. 4A and 4B, a fuel cell stack 15 having an adjustable compression according to the present invention is shown. A plurality of fuel cells 10 are arranged adjacent one another into a fuel cell assembly 44. Fuel cell assembly 44 is disposed between a pair of terminal plates 46 that are used to conduct electrical current to/from fuel cell assembly 44. A pair of end plates 16 are disposed adjacent terminal plates 46 on either side of fuel cell assembly 44. One or more compressing members 38 are positioned between an end plate 16 and the fuel cell assembly 44. The compressing members 38 are operational in response to a control signal to vary the compressive force F imparted on the fuel cell assembly 44 by the compressing members 38. End plates 16 are secured to side plates 48 by mechanical fasteners 62, or by other methods as known in the art.

During operation of the fuel cell stack 15, reactant feed streams are provided to fuel cell stack 15 at a rate that corresponds to a desired power output. The power output of fuel cell stack 15 along with the pressure drop of one or both of the feed streams across fuel cell stack 15 are measured and/or monitored during operation. Optionally, a velocity of one or both of the feed streams flowing through fuel cell stack 15 can also be measured and/or monitored during operation. A control signal is generated based on the measured operational state of the fuel cell stack 15, and compression of fuel cell stack 15 is adjusted by compressing member 38 in response to the control signal. The compression is adjusted until a desired operational state (e.g., pressure drop, flow velocity) is achieved. The adjusting of the compression of fuel cell stack 15 is dynamic in that the amount of compression can be continuously varied based on changes in the operation of the fuel cell stack 15 to maintain a desired operational state. For example, as stated above, a control feedback can be employed such that compression of fuel cell stack 15 is adjusted until the pressure drop across fuel cell stack 15 is of a predetermined magnitude or until a minimum flow velocity of one or more of the feed streams through the fuel cell stack 15 is exceeded.

While flow channels 20 are shown as being generally rectangular, it should be understood that other shapes and configurations that allow compressible diffusion media 32 to intrude into flow channels 20 and decrease flow area 34, can be utilized without departing from the scope of the present invention. Furthermore, while specific pressure drops and power levels have been used to describe and illustrate the present invention, it should be understood that other pressure drops and other operational conditions of fuel cell stack 15 and/or fuel cells 10 can be utilized without departing from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack comprising:
a plurality of fuel cells arranged adjacent one another, at least one fuel cell of said plurality of fuel cells having an electrode plate with a flow field formed therein, a membrane electrode assembly and a compressible fluid-permeable diffusion media disposed between said membrane electrode assembly and said electrode plate; and
a compressing member actively varying compression of said plurality of fuel cells together during operation, said fuel cells being compressed together by said compressing member so that in said at least one fuel cell, a portion of said diffusion media variably intrudes into said flow field of said adjacent electrode plate as a function of compression by said compressing member.

2. The fuel cell stack of claim 1, wherein said compressing member varies said compression of said fuel cells in response to an operating condition of the fuel cell stack.

3. The fuel cell stack of claim 2, wherein said operating condition is a power output of the fuel cell stack.

4. The fuel cell stack of claim 2, wherein said operating condition is a pressure drop of a feed stream flowing through the fuel cell stack.

5. The fuel cell stack of claim 2, wherein said operating condition is a flow velocity of a feed stream flowing through the fuel cell stack.

6. The fuel cell stack of claim 1, wherein said compressing member comprises a fluid bladder.

7. The fuel cell stack of claim 1, wherein said compressing member comprises a fluid controlled ram.

8. The fuel cell stack of claim 1, wherein said compressing member comprises a mechanically controlled ram.

9. The fuel cell stack of claim 1, wherein said electrode plates are anode plates.

10. The fuel cell stack of claim 1, wherein said electrode plates are cathode plates.

11. A method of operating a fuel cell stack, having a plurality of fuel cells with at least one fuel cell of the plurality of fuel cells having an electrode plate with a flow field formed therein, a membrane electrode assembly (MEA) and fluid-permeable diffusion media disposed between said MEA and said electrode plate, by supplying reactant feed streams to said fuel cell stack; and actively varying a compression of said fuel cell stack in response to an operating condition of said fuel cell stack such that said diffusion media moves relative to said flow field to change the effective flow area thereof as a function of said compression during operation of said fuel cell stack.

12. The method of claim 11, further comprising monitoring an operating condition of said fuel cell stack and adjusting said compression of said fuel cell stack in response to said operating condition.

13. The method of claim 12, wherein said monitoring includes monitoring at least one of a power output of said fuel cell stack, a flow rate of a reactant feed stream flowing through said fuel cell stack, and a pressure drop of a reactant feed stream flowing through said fuel cell stack.

14. The method of claim 11, wherein said adjusting includes reducing said compression of said fuel cell stack as a power output of said fuel cell stack increases.

15. The method of claim 11, wherein said adjusting includes increasing said compression of said fuel cell stack as a power output of said fuel cell stack decreases.

16. The method of claim 11, wherein said adjusting includes varying said compression of said fuel cell stack so that a flow velocity of a reactant feed stream flowing through said fuel cell stack is maintained above a predetermined level.

17. The method of claim 11, wherein said adjusting includes varying said compression of said fuel cell stack so that a predetermined pressure drop occurs in a feed stream flowing through said fuel cell stack.

18. The method of claim 17, wherein said predetermined pressure drop is in a range of about 0.1 to about 6 psi.

19. The method of claim 11, wherein said adjusting includes varying a fluid pressure in a bladder that compresses said fuel cell stack.

20. The method of claim 11, wherein said adjusting includes varying a fluid pressure in a ram that compresses said fuel cell stack.

21. The method of claim 11, wherein said adjusting includes varying a mechanical ram that compresses said fuel cell stack.

* * * * *